May 30, 1950 G. W. CRISE 2,509,481
ROTATING VANE PARACHUTE
Filed May 18, 1945 2 Sheets-Sheet 1
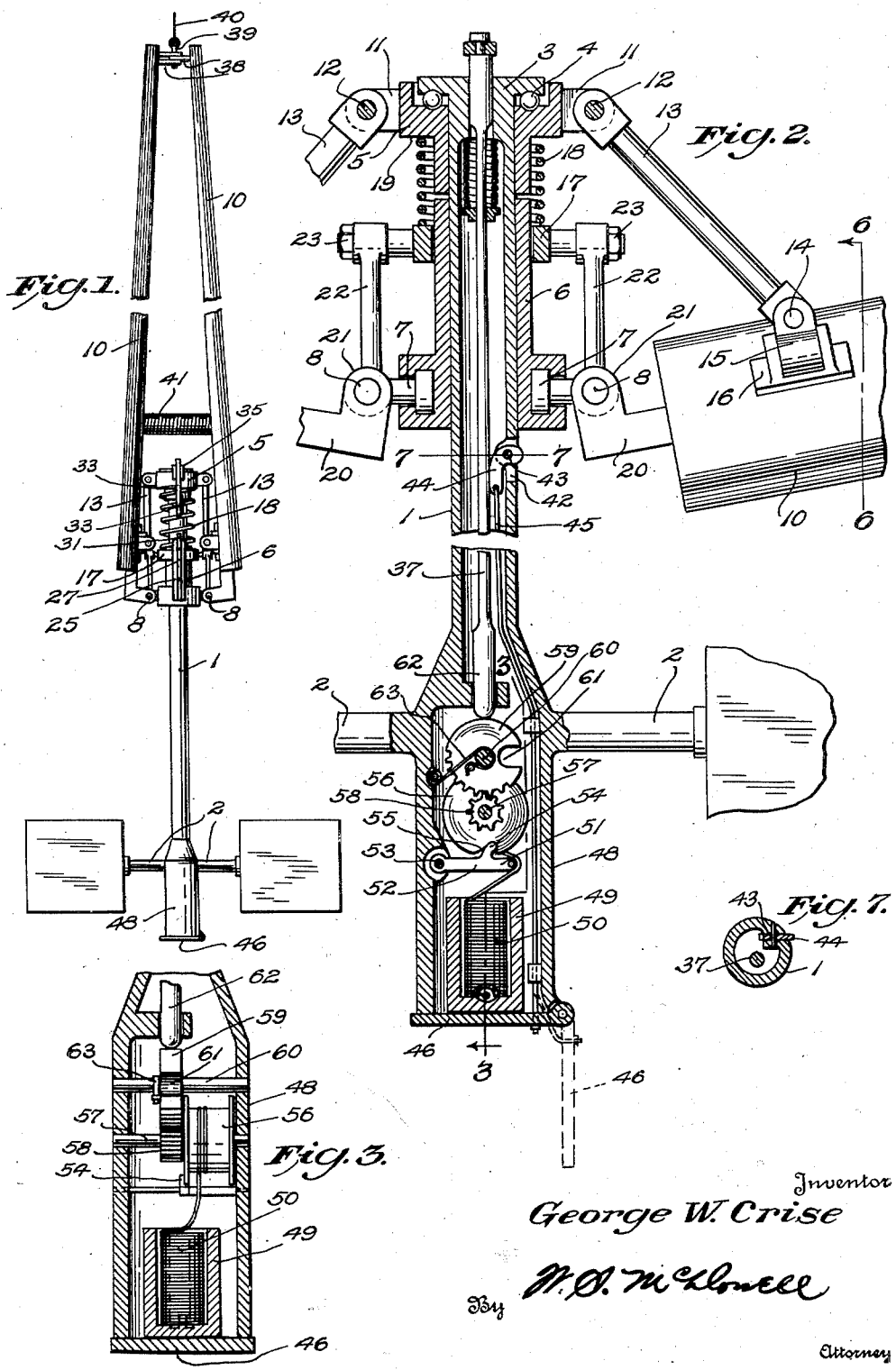
Inventor
George W. Crise
By H. O. McDowell
Attorney

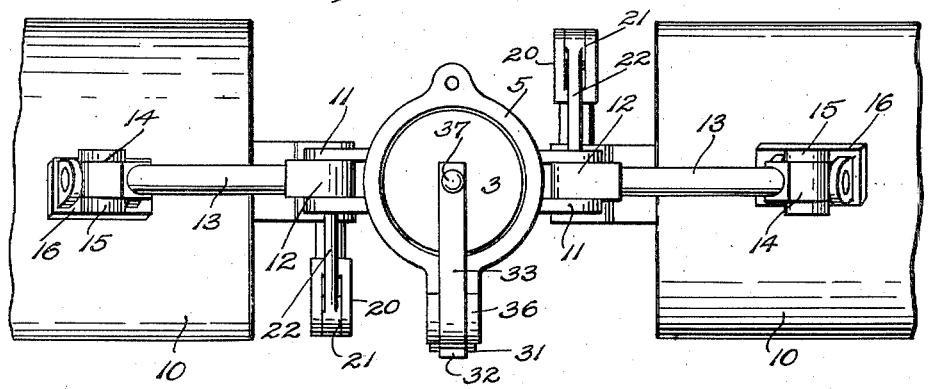

Patented May 30, 1950

2,509,481

UNITED STATES PATENT OFFICE 2,509,481

ROTATING VANE PARACHUTE

George W. Crise, Columbus, Ohio

Application May 18, 1945, Serial No. 594,496

6 Claims. (Cl. 244—138)

This invention relates to aeronautical descent apparatus, having particular reference to devices employed in providing for the safe descent of persons or objects dropped through space from airplanes or the like.

The ordinary umbrella-type parachute now employed in this capacity is objectionable in certain respects: 1st. When it opens, the person supported thereby is subjected to a jerking action; 2nd. The user thereof is apt to be injured by striking the ground with a too rapid descending motion; 3rd. Little or no control is provided in the steering or maneuvering of the parachute to land in a desired location; 4th. It cannot be safely used in making descents of comparatively low altitude; 5th. In the event a certain amount of wind is blowing, the parachute is apt to drag its occupant along the ground after landing; 6th. From a military standpoint, the ordinary parachute is highly visible and makes a good target.

Therefore, it is an outstanding object of my invention to provide a parachute wherein the ordinary flexible and fabric canopy is eliminated and, in lieu thereof, revolving vanes or wings are substituted which operates on the rotor principle to provide for an improved and controlled descent of the parachute.

Other objects of the invention are to provide a rotating vane parachute which, after descent has been initiated, gradually checks its speed so that the occupant thereof is not subjected to jerking forces; a parachute which descends rapidly and upon reaching the proximity of the ground provides automatically for a slower rate of descent to avoid injury to the occupant; a parachute which may be steered during descent to a reasonable degree to provide the occupant with latitude in selecting the landing site; a parachute which is practically invisible during descent or one which offers a poor target when employed in military capacities; and, finally, a parachute which will not drag the user along the ground after landing.

The principle of my parachute is well known insofar as the lifting effect of its rotating wings, vanes or blades is concerned, in that it is analogous to autogyro construction when the pitch of the blades produces rotation by a screw-like action. However, in my improved parachute, a novel combination of mechanical parts found therein changes this autogyro action to that of the helicopter just before a landing operation takes place, whereby to convert the momentum of the rotating wings or vanes into lifting forces for checking the speed of descent of the parachute.

For a further understanding of the invention, reference is to be had to the following description and the accompanying drawing, wherein:

Figure 1 is a side elevational view of my improved parachute when its rotating vanes or blades are inactively positioned;

Fig. 2 is a vertical sectional view taken through the parachute with the vanes or blades in their extended or active positions;

Fig. 3 is a vertical sectional view on the line 3—3 of Fig. 2;

Fig. 4 is a top plan view;

Fig. 5 is an enlarged vertical sectional view taken through the upper portion of the parachute;

Fig. 6 is a transverse vertical sectional view on the line 6—6 of Fig. 2;

Fig. 7 is a detail horizontal sectional view on the line 7—7 of Fig. 2.

Referring more particularly to the drawings, my improved aerial descent device, which may be referred to herein as a parachute, comprises a tubular column or frame 1 composed preferably of a lightweight metal. Adjacent to its lower end, the frame is enlarged diametrically and is formed with laterally projecting occupant-seating extensions 2. At its upper end, the column or frame is formed with a collar 3 constituting a seat for antifriction bearings 4. Rotatably surrounding the column 1 and engaging with the bearings 4 is a sleeve 5.

Also rotatable on the upper end of the column or frame is a second sleeve 6 which carries rotatable laterally projecting studs 7 and to the outer ends of these studs, there is pivotally connected, as at 8, the bracket arms provided on the inner ends of a pair of rotatable wings or blades 10. The latter may swing in a vertical plane about the horizontal axes 8 from their folded and upright inactive positions, as shown in Fig. 1, to their lowered and substantially horizontally extended or dihedral active positions, disclosed in Fig. 2. Also, through the provisions of the studs 7, the wings or blades may be turned about axes perpendicular to the axes 8, thereby varying the pitch or lift of the wings or blades.

The upper sleeve 5 is provided with laterally directed ears 11, which are pivotally united as at 12 with the upper ends of a pair of rods 13. The lower ends of these rods are pivotally united as at 14 with rocker elements 15 which are mounted in blade-carried brackets 16 for turning movement about axes perpendicular to the pivotal axes provided at 14. By this arrangement, the wings or blades are mechanically united with the upper sleeve 5 in all positions of pitch adjustment.

Slidably mounted on the lower sleeve 6 is a ring 17, and a coil spring 18 is situated between the upper surface of the ring 17 and the lower shouldered surface 19 of the sleeve 5. The outer ends of the studs 7 are formed with laterally directed crank arms 20, and the outer ends of these crank arms are pivotally connected as at 21 with the lower ends of links shown at 22, the upper ends of these links being pivotally united as at 23 with the ring 17.

The lower sleeve 6 has pivoted thereto as at 24 the lower end of a pair of toggle arms 25. Intermediately of their length, the arms 25 have pivoted thereto as at 26 a link 27, the upper end of this link being pivotally united as at 28 with the ring 17, the link adjacent to this pivotal connection being formed with a latching shoulder 29. Pivotally mounted as at 30 on the upper end of the arm 25 is a latch 31 which, when the wings or vanes are in their lowered active positions, is disposed in contact with the shoulder 29. The latch when so positioned has its finger, shown at 32, disposed in the path of movement of a spring actuated movable arm 33. Intermediately of its length, the arm 33 is pivotally united, as at 35, with an ear 36 projecting from the upper sleeve 5. The horizontal portion of the arm 33 is in pivotal engagement with the upper end of a vertically movable rod 37 mounted axially in the column or frame 1.

With the blades or vanes positioned inactively, as in Fig. 1, the upper ends thereof are united by means of interfitting apertured lugs 38, the lugs being secured together by a removable pin 39 which passes through the apertures thereof. This pin is connected with one end of a release cord or line 40, the opposite end of the latter being secured to the airplane body in which the parachute is loaded, or may be actuated by the occupant. An expansion spring 41 is so positioned with respect to the blades that its normal tendency is to force the wings or blades apart. Upon initial descent of the parachute, and when the line 40 becomes taut, the pin 39 is removed from engagement with the lugs 38, and the spring supplies an initiating force for separating the wings or blades and causing the same to oscillate downwardly and outwardly about the axes provided at 8 in pitch relation. Thereafter, through wind action, the same are caused to rotate about the longitudinal axis of the column or frame 1. Such rotation through centrifugal action results in the elevation of the lower sleeve 6 so that when the wings or blades approach their position of rotation, the sleeve 6 will occupy a position uncovering a slot 42 formed in the column or frame 1. Pivotally mounted as at 43 in this slot is a pawl 44 and to the downwardly extending arm of this pawl there is connected a cord 45 which leads to a door 46 pivoted as at 47 on the bottom of the column or frame 1, the door normally closing a compartment 48 provided in the enlarged lower end of said column. When the horizontal portion of the pawl 44 is in contact with the inner wall of the sleeve 6, the pawl is oscillated to maintain the door 46 in its closed position, but when the sleeve 6 is elevated, as in Fig. 2, the pawl is rocked to assume a position providing for the opening of the door 46.

Supported on the door 46 and arranged within the compartment 48 is a weight 49 containing a coiled cable 50, one end of the cable being secured to said weight. Above the weight, the cable 50 passes over the outer end 51 of a detent 52, the latter being pivoted as at 53 in the column or frame 1 and formed intermediately of its length with a finger 54 which is positioned in a notch 55 provided in one of the side walls of a cable reel 56 and to which reel the other end of the cable is attached after the cable has been wound thereabout.

The reel 56 is carried by a transversely journaled shaft 57 which has fixed thereto a pinion 58, the latter meshing with the teeth of an escapement wheel 59 which is rotatably supported by a shaft 60. The wheel 59 is notched as at 61 to receive the lower end 62 of the plunger rod 37. A spring shown as 63 cooperates with the wheel 59 to produce rotation thereof when the finger 54 of the detent 52 is removed from the notch 55.

The operation of my improved parachute may be summarized as follows: With the line 40 attached to a relatively stationary part of an aircraft from which descent is to be made, the parachute with its load is dropped into space. When the line 40 tightens, the pin 39 is removed from engagement with the lugs 38, allowing the spring 41 to thrust the rotor blades 10 apart, whereupon, the force of the air causes the negatively pitched blades to rotate. This rotation sets up centrifugal force, causing the wings or blades to swing downwardly in a wide arc, thereby compressing the spring 18 and positioning the latch 31 in engagement with the shoulder 29, holding the arm 33 against outward movement.

As the rotating wings or blades open, they gradually reduce the falling speed of the parachute until a predetermined rate of descent is reached. As soon as the wings or blades 10 have opened, the slidable hub sleeve 6 will have risen to a point uncovering the pawl 44, which oscillates under the tension of the cord 45 to cause the opening of the door 46, thus releasing the cable weight 49. The holder falls until the cable 50 has been completely extended and becomes taut. The tightening of the cable over the end of the detent 52 causes said detent to rock and release the finger 54 thereof from the notch 55 of the reel 56. However, the reel cannot rotate as long as the weight holds the cord under tension. With the cable holder or weight hanging well below the parachute, the same strikes the ground well in advance of the parachute proper, and upon so striking, will produce slackness in the cable 50, which will free the reel 56 for rotation under the urge of the escapement wheel 59, as driven by the spring 63, until the notch 61 of said wheel indexes with the lower end of the rod 37. This causes the rod to drop, releasing the arm 33 and causing it to swing outwardly under spring action. Such outward movement of the arm 33 results in tripping the latch 31 and releasing the toggle arms 25 and 27. This permits the spring 18 to force the ring 17 downwardly, and through the crank arms 20 and links 22 to vary the pitch of the blades or vanes from negative to positive status. This change in the pitch of the blades or vanes from negative to positive adds additional lift to the parachute, thereby arresting its descent speed without attention on the part of the user.

While I have illustrated and described a single preferred embodiment of my present invention, nevertheless, it will be understood that the same is subject to considerable mechanical variation or modification without departing necessarily from the spirit of the invention or the scope of the following claims. For example, while I have shown the parachute as being provided with a pair of rotatable vanes or blades, any other suitable number may be employed and many other similar mechanical changes will be apparent to those skilled in the art. However, I reserve the right to employ all such variations that may be said to fall fairly within the scope of the following claims.

I claim:

1. An aerial descent device comprising a central support, a plurality of relatively spaced variable pitch blades rotatable about the vertical axis of said support during descent of the carrier and by wind generated forces on said blades, there being a chamber formed in the lower end of said support, a movable closure for said chamber, means responsive to the rotation of the blades to move said closure to a position opening said chamber, ground engaging means normally held in and adapted to be dropped from said chamber upon the opening of said closure, and means actuated upon the contacting of the ground engaging means with the ground to vary the pitch adjustment of said blades.

2. An aerial descent carrier comprising a central support, a sleeve slidably and rotatably mounted on said support, a plurality of blades having the inner ends thereof pivotally joined with said sleeve, a collar rotatable on said column above said sleeve, rods pivotally connected at their ends with said collar and with said blades, a ring rotatably surrounding said sleeve, spring means interposed between said ring and collar, latch means to hold the spring restrained, and a reel mechanism to trip the latch means.

3. An aerial descent device comprising a central support, a sleeve slidably and rotatably mounted on said support, a plurality of relatively spaced variable pitch blades rotatably joined at their inner ends with said support, latch devices normally maintaining said blades in inactive side by side relationship, spring means interposed between said blades and operable upon release of said latch devices to force said blades apart to cause the same to assume rotating weight-sustaining positions, a reel mechanism carried by said support, a ground-engaging weight, a cable line connected at one end with said weight and at its other end with said reel mechanism, movable means normally supporting said weight in connection with said support, and a release for said movable means operative automatically upon predetermined rotational speed of said blades and sliding movement on the part of said sleeve to drop said weight from said support.

4. An aerial descent device for human beings comprising a central support, a seat structure on said support, stabilizing wings joined with said seat structure, blades rotatable about the upper end of said support, releasable latch devices normally holding said blades in folded inactive positions substantially parallel with the longitudinal axis of said support, and spring means interposed between said blades and operative upon release of said latch devices to positively advance said blades toward the lowered positions of rotation with the blades extending outwardly from said support.

5. An aerial descent device for use by human beings comprising: a central support, a sleeve rotatably and slidably mounted on the upper end of said support, a ring surrounding said sleeve, a plurality of relatively spaced variable pitch blades having the inner ends thereof pivotally attached to said sleeve for turning movement about substantially horizontal axes, crank devices connected with said ring and said blades for varying the pitch of said blades, a spring for moving said ring and actuating said crank devices, latch means normally restraining said ring against movement by said spring, a reel mechanism carried by said support, a weight, a cable line joined at one end with said weight and at its other end with said reel mechanism, movable means normally restraining said weight against movement, means operative automatically when said blades rotate at sufficient speed to produce a predetermined lifting action to actuate said movable means to drop said weight, and means operative upon engagement of the weight with the ground to release said latch means to permit said spring to move said ring to a position varying the pitch adjustment of said blades with respect to that which the blades occupy prior to the engagement of the weight with the ground.

6. In an aerial descent device for a human occupant, a load-supporting frame, a pair of relatively thin section air foil blades rotatably mounted about said frame, hinge means for folding said blades in grouped substantially vertical order, release means for disconnecting said holding means, means for urging said blades from their folded positions into spreaded air-engaging relation in which the blades maintain a normal air screw relationship, twisting means whereby the angles of incidence of the blades may be simultaneously changed from a normal pitch of windmill descent to positive incidence of air attack, said latter means including a spring under tension, a latch for holding said spring under tension, a weight suspended on a line which at one end is operatively connected to said latch, a secondary spring urging the release of said latch, said secondary spring being of such strength that upon releasing the tension which the weight normally exerts upon the line will cause the secondary spring to release the latch and permit the twisting means to change the angle of attack of the rotating blades from that of normal windmill descent to one of positive attack.

GEORGE W. CRISE.

REFERENCES CITED

The following references are of record in the file of this patent:

UNITED STATES PATENTS

| Number | Name | Date |
| --- | --- | --- |
| 1,919,089 | Breguet | July 18, 1933 |
| 2,044,819 | Taylor | June 23, 1936 |
| 2,440,293 | Stanley | Apr. 27, 1948 |

FOREIGN PATENTS

| Number | Country | Date |
| --- | --- | --- |
| 379,812 | Germany | Aug. 29, 1923 |
| 660,793 | Germany | June 12, 1938 |
| 800,738 | France | May 11, 1936 |